(12) United States Patent
Raffin et al.

(10) Patent No.: US 10,294,434 B2
(45) Date of Patent: May 21, 2019

(54) CHROMIUM OXIDE PRODUCT

(71) Applicant: SAINT-GOBAIN CENTRE DE RECHERCHES ET D'ETUDES EUROPEEN, Courbevoie (FR)

(72) Inventors: Nicolas Raffin, Le Thor (FR); Laurie San Miguel, Althen des Paluds (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 14/435,927

(22) PCT Filed: Oct. 15, 2013

(86) PCT No.: PCT/IB2013/059355
§ 371 (c)(1),
(2) Date: Apr. 15, 2015

(87) PCT Pub. No.: WO2014/060940
PCT Pub. Date: Apr. 24, 2014

(65) Prior Publication Data
US 2015/0267133 A1    Sep. 24, 2015

(30) Foreign Application Priority Data
Oct. 15, 2012   (FR) ...................................... 12 59832

(51) Int. Cl.
| | |
|---|---|
| *C10J 3/72* | (2006.01) |
| *C04B 35/64* | (2006.01) |
| *B28B 11/24* | (2006.01) |
| *C04B 35/12* | (2006.01) |
| *C10J 3/74* | (2006.01) |
| *F27D 1/00* | (2006.01) |
| *C04B 35/626* | (2006.01) |
| *C04B 35/66* | (2006.01) |
| *C04B 35/105* | (2006.01) |
| *C04B 35/106* | (2006.01) |

(52) U.S. Cl.
CPC .............. *C10J 3/72* (2013.01); *B28B 11/243* (2013.01); *C04B 35/105* (2013.01); *C04B 35/106* (2013.01); *C04B 35/12* (2013.01); *C04B 35/62655* (2013.01); *C04B 35/64* (2013.01); *C04B 35/66* (2013.01); *C10J 3/74* (2013.01); *F27D 1/0006* (2013.01); *C04B 2235/3206* (2013.01); *C04B 2235/3208* (2013.01); *C04B 2235/3217* (2013.01); *C04B 2235/3225* (2013.01); *C04B 2235/3232* (2013.01); *C04B 2235/3241* (2013.01); *C04B 2235/3246* (2013.01); *C04B 2235/349* (2013.01); *C04B 2235/3418* (2013.01); *C04B 2235/5427* (2013.01); *C04B 2235/5436* (2013.01); *C04B 2235/5463* (2013.01); *C04B 2235/6583* (2013.01); *C04B 2235/72* (2013.01); *C04B 2235/77* (2013.01); *C04B 2235/96* (2013.01); *C04B 2235/9669* (2013.01); *C10J 2200/09* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,452,957 | B1* | 9/2002 | Burger | .................... A61L 27/10 373/137 |
| 2003/0126803 | A1* | 7/2003 | Rosenflanz | ......... C03B 19/1005 51/307 |
| 2006/0211566 | A1 | 9/2006 | Champion et al. | |
| 2008/0048569 | A1* | 2/2008 | Sato | ....................... B82Y 10/00 315/169.1 |
| 2009/0011920 | A1* | 1/2009 | Champion | ............... C04B 35/12 501/105 |
| 2010/0152018 | A1* | 6/2010 | Kuntz | ................... C04B 35/119 501/104 |
| 2011/0251042 | A1* | 10/2011 | Araki | .................... C04B 35/111 501/32 |

(Continued)

FOREIGN PATENT DOCUMENTS

| | | |
|---|---|---|
| FR | 2 883 282 A1 | 9/2006 |
| JP | S64-62451 A | 3/1989 |

(Continued)

OTHER PUBLICATIONS

Feb. 26, 2014 Search Report issued in International Application No. PCT/IB2013/059355.
Feb. 26, 2014 Written Opinion issued in International Application No. PCT/IB2013/059355.
Mar. 8, 2013 Written Opinion issued in French Application No. 12 59832.
Jayaratna, Manikpurage et al., "Hot pressing of Y2O3-stabilized ZrO2 with Cr2O3 additions", Journal of Materials Science, vol. 21, No. 2, Feb. 1, 1986, pp. 591-596.

(Continued)

*Primary Examiner* — Kaity V Chandler
(74) *Attorney, Agent, or Firm* — Oliff PLC

(57) ABSTRACT

A sintered refractory product having a granulate bonded by a matrix and comprising, in percentages by mass based on the oxides, —more than 40% chromium oxide $Cr_2O_3$, —less than 50% aluminium oxide $Al_2O_3$, –1% or more zirconium oxide $ZrO_2$, of which at least 20% by mass is stabilised in the cubic and/or quadratic form, –0.1% or more yttrium oxide $Y_2O_3$, acting as a stabiliser for the zirconium oxide $ZrO_2$, —less than 1.9% hafnium oxide $HfO_2$, the total content of chromium, aluminium and zirconium oxides $Cr_2O_2+Al_2O_3+ZrO_2$ being greater than 70%.

24 Claims, No Drawings

(56) References Cited

U.S. PATENT DOCUMENTS

2012/0046156 A1* 2/2012 Gaubil .................... C03B 5/43
  501/104
2012/0282469 A1* 11/2012 Nahas .................. C04B 35/111
  428/402
2014/0030163 A1   1/2014 His et al.

FOREIGN PATENT DOCUMENTS

| WO | 2006/097609 A1 | 9/2006 |
| WO | 2008/109222 A2 | 9/2008 |
| WO | 2012/140624 A1 | 10/2012 |

OTHER PUBLICATIONS

Taber, Wade A. et al., "Refractories for Gasification", Refractories Applications and News, vol. 8, No. 4, Jul./Aug. 2003, pp. 18-22.
Bennet, James P. et al., "Refractory Liner Materials Used in Slagging Gasifiers", Refractories Applications and News, vol. 9, No. 5, Sep./Oct. 2004, pp. 20-25.
Clayton, Stewart J. et al., "Gasification Technologies, Gasification Markets and Technologies—Present and Future, an Industry Perspective", U.S. Department of Energy Report, Jul. 2002, pp. 1-100.

\* cited by examiner

CHROMIUM OXIDE PRODUCT

CROSS-REFERENCE TO RELATED APPLICATIONS

Not applicable.

BACKGROUND OF THE INVENTION

Technical Field

The invention relates to a refractory product comprising chromium oxide, used in particular as internal lining of a gasifying reactor or "gasifier".

State of the Art

A gasifier used for gasifying coal is known in particular. The process for the gasification of coal, which has been known for approximately fifty years, is currently undergoing strong growth. This is because it makes it possible, starting from very diverse hydrocarbon materials, for example coal, petroleum coke, biomass, wood, wood charcoal, indeed even heavy oils to be recycled, to produce synthesis gases which are used, on the one hand, as clean energy source and, on the other hand, as base compounds for the chemical industry. In addition, this process makes it possible to remove undesirable components, for example NOx, sulfur or mercury, before any discharge to the atmosphere.

The principle of gasification consists of a controlled partial combustion, under pressure and in the presence of steam or of oxygen, at a temperature of between 1000 and 1600° C. approximately.

Various types of gasifiers exist: fixed bed gasifiers, fluidized bed gasifiers or entrained bed gasifiers. These gasifiers differ in the method of introduction of reactants, the way in which the oxidant/fuel mixture is produced, the temperature and pressure conditions and the process for discharging the ash or liquid waste slag resulting from the reaction.

The article entitled "*Refractories for Gasification*" which appeared in the review "*Refractories Applications and News*", Volume 8, Number 4, July-August 2003, written by Wade Taber of the Energy Systems Department of the Saint-Gobain Industrial Ceramics Division, describes the structure of an internal refractory lining of a gasifier. This gasifier is lined with different layers of refractory products capable of withstanding the conditions of temperature, pressure and chemical environment to which they are subjected during gasification. The layers of refractory products thus protect the internal metal wall of the gasifier from heat and from corrosion by the gases and slags.

The slags in gasifiers are typically composed of $SiO_2$, $FeO$ or $Fe_2O_3$, $CaO$ and $Al_2O_3$. They may also comprise other oxides resulting from the materials which feed the gasifier. The basicity index $B=(CaO+MgO+Fe_2O_3)/(Al_2O_3+SiO_2)$ is typically approximately 0.6 and the ratio $C/S=CaO/SiO_2$ is typically 0.4, the contents being as percentages by weight.

In order to increase the lifetime of the refractory linings, subjected to corrosion by slags and to thermal cycling, researchers have attempted to increase their thickness. However, this solution exhibits the disadvantage of reducing the working volume of the gasifier and thus its output.

James P. Bennett, in the article "*Refractory liner used in slagging gasifiers*" which appeared in the review "*Refractories Applications and News*", Volume 9, Number 5, September/October 2004, pages 20-25, explains that the lifetime of the current refractory linings of gasifiers, in particular of the air-cooled systems, is very limited despite their high content of chromium oxide. He mentions in particular the report by S. J. Clayton, G. J. Stiegel and J. G. Wimer "*Gasification Technologies, Gasification Markets and Technologies—Present and Future, an Industry Perspective*", US DOE, DOE/FE report 0447, July 2002.

FR 2 883 282 describes an internal refractory lining of a gasifier exhibiting at least one region made of a sintered material comprising, as percentages by weight, at least 40% of chromium oxide ($Cr_2O_3$) and at least 1% of zirconium oxide ($ZrO_2$), at least 20% by weight of said zirconium oxide ($ZrO_2$) being stabilized in the cubic and/or tetragonal form, the zirconium oxide being in particular stabilized with calcium oxide. This lining thus exhibits a better corrosion resistance.

WO 2008/109222 provides a treatment for the protection of the refractory products making up the refractory lining of gasifiers.

There exists an ongoing need for a refractory product exhibiting an even better resistance to corrosion by slags while satisfactorily withstanding the thermal shocks encountered inside gasifiers.

The aim of the invention is to meet this need.

SUMMARY OF THE INVENTION

According to the invention, this aim is achieved by means of a sintered refractory product exhibiting an aggregate bonded by a matrix and comprising, as percentages by weight on the basis of the oxides, more than 40% of chromium oxide ($Cr_2O_3$), less than 50% of aluminum oxide ($Al_2O_3$), 1% or more of zirconium oxide ($ZrO_2$), at least 20% by weight of which is stabilized in the cubic and/or tetragonal form, 0.1% or more of yttrium oxide ($Y_2O_3$) acting as stabilizer for the zirconium oxide ($ZrO_2$) and less than 1.9% of hafnium oxide ($HfO_2$), the total content of chromium oxide, aluminum oxide and zirconium oxide ($Cr_2O_3+Al_2O_3+ZrO_2$) being greater than 70%.

As will be seen in more detail in the continuation of the description, surprisingly, the presence of zirconium oxide specifically stabilized with yttrium oxide makes it possible to improve the resistance to infiltration and to attack by slags and also to retain, indeed even improve, the resistance to thermal shocks.

A product according to the invention may also exhibit one or more of the following optional characteristics:

Preferably, the content of chromium oxide ($Cr_2O_3$) is greater than 50%, indeed even greater than 55%, indeed even greater than 60%, indeed even greater than 65%, indeed even greater than 70%, indeed even greater than 75%, indeed even greater than 80%, greater than 85%, and/or less than 95%, as percentages by weight.

Preferably, the content of aluminum oxide ($Al_2O_3$) is greater than 1%, indeed even greater than 1.5%, indeed even greater than 2%, and/or less than 45%, indeed even less than 40%, indeed even less than 35%, indeed even less than 30%, indeed even less than 20%, indeed even less than 10%, indeed even less than 8%, indeed even less than 5%, indeed even less than 4%, as percentages by weight.

Preferably, the content of aluminum oxide ($Al_2O_3$) in the matrix is greater than 1%, indeed even greater than 1.5%, and/or less than 10%, indeed even less than 8%, indeed even less than 5%, as percentage by weight on the basis of the weight of the oxides of the product.

Preferably, the content of zirconium oxide ($ZrO_2$) is greater than 3%, indeed even greater than 4.5%, indeed even greater than 5%, indeed even greater than 6%, and/or less than 10%, less than 9% or less than 8%, as percentages by weight.

Preferably, more than 30%, more than 40%, more than 50%, more than 60%, of the zirconium oxide, as percentage by weight, is stabilized in the cubic and/or tetragonal form.

The only zirconium oxide present in the matrix preferably represents more than 2.5%, indeed even more than 4%, indeed even more than 5% of the total weight of the product.

The total content of chromium oxide, aluminum oxide and zirconium oxide ($Cr_2O_3+Al_2O_3+ZrO_2$) is greater than 80%, greater than 85%, greater than 90%, as percentage by weight.

The total content of the oxides other than $Cr_2O_3$, $Al_2O_3$, $ZrO_2$, $Y_2O_3$ and $HfO_2$ is less than 25%, less than 20%, less than 15%, less than 10% or less than 5%.

Preferably, the content of yttrium oxide ($Y_2O_3$) is greater than 0.15%, indeed even greater than 0.20%, indeed even greater than 0.25%, indeed even greater than 0.30%, indeed even greater than 0.35%, indeed even greater than 0.40%, and/or less than 6.0%, less than 5.0%, less than 4.0%, less than 3.0%, less than 2.0% or less than 1.0%, as percentages by weight.

Preferably, more than 90%, more than 95%, indeed even more than 97%, or substantially 100%, of the yttrium oxide ($Y_2O_3$) is present in the matrix.

Said product comprises a codopant, acting or not acting as stabilizer for the zirconium oxide, chosen from CaO, MgO, $TiO_2$ and their mixtures, preferably CaO.

The content of calcium oxide (CaO) is greater than 0.03%, indeed even greater than 0.04%, indeed even greater than 0.05%, indeed even greater than 0.1%, indeed even greater than 0.2%, indeed even greater than 0.5% and/or less than 5.0%, indeed even less than 4.0%, indeed even less than 3.0%, indeed even less than 2.0%, indeed even less than 1.0%, as percentages by weight.

The content of magnesium oxide (MgO) is greater than 0.1%, indeed even greater than 0.2%, indeed even greater than 0.5%, and/or less than 4.0%, indeed even less than 3.0%, indeed even less than 2.0%, indeed even less than 1.0%, as percentages by weight.

The content of titanium oxide ($TiO_2$) is greater than 0.5% and/or less than 4.0%, indeed even less than 3.0%, indeed even less than 2.0%, indeed even less than 1.0%, as percentages by weight.

Preferably, the sum of the contents of calcium oxide, magnesium oxide and titanium oxide (CaO+MgO+$TiO_2$) is less than 6.0%, indeed even less than 5.0%, indeed even less than 4.0%, indeed even less than 3.0%, and/or greater than 0.5%, greater than 1.0%, indeed even greater than 2.0%, as percentages by weight.

Preferably again, a codopant acts, at least in part, as stabilizer for the zirconium oxide.

In one embodiment, more than 50%, more than 75%, indeed even more than 90%, more than 95%, indeed substantially 100%, of the yttrium oxide and of the codopant, in particular of the calcium oxide, is present in the matrix, as percentage by weight.

Preferably, the content of silicon oxide ($SiO_2$) is greater than 0.5%, indeed even greater than 0.7%, indeed even greater than 1%, and/or less than 6%, indeed even less than 5%, indeed even less than 4%, indeed even less than 3%, indeed even less than 1.5%, as percentages by weight.

Preferably, the content of hafnium oxide ($HfO_2$) in the product is less than 1.8%, indeed even less than 1.7%, indeed even less than 1.5%, indeed even less than 1.2%, indeed even less than 1%, less than 0.8%, less than 0.5%, less than 0.3%, indeed even less than 0.2%, indeed even less than 0.1%, as percentages by weight.

Preferably, the sum of the contents of chromium oxide ($Cr_2O_3$), aluminum oxide ($Al_2O_3$), zirconium oxide ($ZrO_2$), yttrium oxide ($Y_2O_3$), calcium oxide (CaO), silicon oxide ($SiO_2$), titanium oxide ($TiO_2$), magnesium oxide (MgO) and hafnium oxide ($HfO_2$) is greater than 95%, preferably greater than 98%, as percentages by weight, the other constituents of the product preferably being impurities. The impurities conventionally comprise iron, predominantly in the $Fe_2O_3$ form, and oxides of alkali metals, such as $Na_2O$ and $K_2O$. It is considered that such contents of impurities do not cast doubt upon the advantages provided by the invention.

Preferably, the oxides represent more than 90%, more than 95%, more than 99%, indeed even substantially 100%, of the weight of the product.

The open porosity of the product is greater than 5%, greater than 8%, greater than 10%, and/or less than 25%, less than 20%, indeed even less than 15%.

The product is provided in the form of a layer applied against the internal wall of a reactor of the gasifier or in the form of an assembly of blocks arranged in order to protect said wall. Preferably, the entire layer or all the blocks of the assembly are composed of a product according to the invention.

Surprisingly, the inventors have also found that a product according to the invention may exhibit a noteworthy resistance to corrosion.

In particular, a product according to the invention exhibits an improved resistance to the penetration of the slag. It is known that the resistance to corrosion results both from the resistance to dissolution by the slag and also from the resistance to the penetration of the slag into the refractory product. Specifically, this penetration results in different properties with regard to the penetration layer and results in spalling: pieces of refractory product may then become detached during use. It is known that spalling is the main cause of damage for the products having a high chromium content, which are furthermore known to have a good resistance to chemical dissolution.

Preferably, the aggregate represents more than 60%, more than 70%, and/or less than 90% or less than 80% of the weight of the product, the remainder to 100% being composed of the matrix.

According to one embodiment, the structure of the product exhibits an aggregate composed, for more than 80%, more than 85%, more than 90%, more than 95%, indeed even more than 97% of its weight, of chromium oxide and/or aluminum oxide, said aggregate being bonded by a matrix composed, for more than 90%, indeed even more than 94%, of its weight of zirconium oxide and/or yttrium oxide and/or chromium oxide and/or aluminum oxide and/or silicon oxide and optionally of a codopant chosen from CaO, MgO, $TiO_2$ and their mixtures, the codopant acting or not acting as stabilizer for the zirconium oxide. In particular, the codopant may be CaO.

The invention also relates to a gasifier comprising a reactor provided with an internal wall lined, at least partially, with a refractory lining comprising a refractory product according to the invention, indeed even composed of such a product.

Said refractory product may be provided in the form of a layer or in the form of a block.

The invention also relates to a preform suitable for resulting, by sintering, in a sintered refractory product according to the invention, and to a particulate mixture suitable for resulting, by shaping, in a preform according to the invention.

Finally, the invention relates to a manufacturing process comprising the following successive stages:
  a) preparation of a charge,
  b) casting said charge in a mold and shaping, for example by vibrating and/or pressing and/or pounding said charge inside the mold, so as to form a preform,
  c) removing the preform from the mold,
  d) preferably, drying the preform, preferably under air or an atmosphere controlled in humidity, preferably so that the residual moisture content of the preform is between 0 and 0.5%,
  e) firing the preform, preferably under an oxidizing atmosphere, at a temperature of between 1300 and 1600° C., so as to form a sintered refractory product.

According to the invention, the charge is suitable for resulting, at the end of stage e), in a sintered refractory product according to the invention and comprises a matrix fraction comprising a zirconium oxide powder stabilized, at least in part, indeed even completely, with yttrium oxide, preferably with more than 1%, indeed even more than 2%, indeed even more than 3% of yttrium oxide, as percentage by weight on the basis of the total weight of zirconium oxide and yttrium oxide.

According to one embodiment, the matrix fraction comprises a zirconium oxide power stabilized with yttrium oxide additionally comprising a codopant. Preferably, the codopant is CaO.

Preferably, the matrix fraction comprises at least one stabilized zirconium oxide powder exhibiting a median size of greater than 5 µm.

According to an embodiment which makes it possible to manufacture a sintered refractory product according to the invention exhibiting an excellent resistance to thermal shocks, the matrix fraction comprises, as percentage by weight on the basis of the product:
  more than 1%, preferably more than 2%, indeed even more than 2.5% or more than 3%, and/or less than 10%, preferably less than 7.5%, preferably less than 5%, of a first powder composed of particles comprising, as percentage by weight, more than 80%, preferably more than 90%, indeed even substantially 100%, of zirconium oxide stabilized with yttrium oxide,
  more than 40%, preferably more than 50%, preferably more than 60%, and/or less than 90%, indeed even less than 80% of the zirconium oxide preferably being stabilized in the tetragonal and/or cubic form, as a percentage by weight on the basis of the zirconium oxide,
  the $D_{90}$ percentile of said first powder being less than 100 µm, indeed even less 60 µm, indeed even less than 50 µm, and/or greater than 10 µm, greater than 20 µm, indeed even greater than 30 µm,
  preferably, the median size $D_{50}$ of said first powder being greater than 2 µm, indeed even greater than 5 µm, and/or less than 30 µm, indeed even less than 20 µm, indeed even less than 15 µm, and
  more than 1%, indeed even more than 1.5%, and/or less than 10%, less than 7%, less than 5%, of a second powder composed of particles comprising, as percentage by weight, more than 80%, preferably more than 90%, indeed even substantially 100%, of zirconium oxide stabilized with calcium oxide and yttrium oxide,
  more than 40%, preferably more than 50%, preferably more than 60%, and/or less than 90%, indeed even less than 80% of the zirconium oxide preferably being stabilized in the tetragonal and/or cubic form, as a percentage by weight on the basis of the zirconium oxide,
  the $D_{90}$ percentile of said second powder being less than 100 µm, indeed even less than 60 µm, indeed even less than 50 µm, and/or greater than 20 µm, indeed even greater than 30 µm, indeed even greater than 40 µm,
  preferably, the median size $D_{50}$ of said second powder being greater than 2 µm, indeed even greater than 5 µm, indeed even greater than 10 µm, and/or less than 30 µm, indeed even less than 20 µm, indeed even less than 15 µm.

In the first powder, the percentage by weight of yttrium oxide is preferably greater than 3%, greater than 5%, and/or less than 15%, less than 10%, indeed even less than 8%, as percentage by weight on the basis of the sum of the yttrium oxide and zirconium oxide.

In the second powder, the percentage by weight of calcium oxide is preferably greater than 1%, greater than 2%, and/or less than 10%, less than 5%, and/or the percentage of yttrium oxide is preferably greater than 0.5% and/or less than 5%, less than 3%, as percentages by weight on the basis of the sum of the zirconium oxide, calcium oxide and yttrium oxide.

The zirconium oxide sources may comprise hafnium oxide, conventionally less than 2% of hafnium oxide.

Definitions

"Preform" is conventionally understood to mean an assembly of particles bonded by means of a binder, generally a temporary binder, the microstructure of which will change during the sintering. A preform may in particular exhibit the form of a block or of a layer, for example sprayed onto a wall of a reactor.

"Particle" is understood to mean a solid object within a powder or "particulate mixture". A distinction is made in particular between the particles exhibiting a size of greater than 150 µm, known as "grains", and those exhibiting a size of less than or equal to 150 µm, known as "fine particles" or "matrix particles". The assembly of the grains constitutes the "aggregate". The assembly of the matrix particles constitutes the "matrix fraction".

By extension, "aggregate" and "matrix fraction" also refer to the grains and matrix particles after they have been rendered integral in the form of a preform. "Aggregate" also denotes the grains bonded by the matrix after sintering.

"Particulate mixture" is understood to mean a dry mixture of particles (not bonded to one another).

"Size" of a particle refers to the mean of its larger dimension dM and of its smaller dimension dm: (dM+dm)/2. The size of the particles of a particulate mixture is evaluated conventionally by characterization of particle size distribution carried out with a laser particle sizer. The laser particle sizer may, for example, be a Partica LA-950 from Horiba.

The percentiles or "centiles" 10 ($D_{10}$), 50 ($D_{50}$), 90 ($D_{90}$) and 99.5 ($D_{99.5}$) of a powder are the sizes of particles corresponding to the percentages, by weight, of 10%, 50%, 90% and 99.5% respectively on the cumulative particle size distribution curve of the particles of the powder, the sizes of particles being classified by increasing order. For example, 10% by weight of the particles of the powder have a size of less than $D_{10}$ and 90% by weight of the particles have a size of greater than or equal to $D_{10}$. The percentiles may be evaluated using a particle size distribution produced using a laser particle sizer.

"Maximum size" refers to the 99.5 ($D_{99.5}$) percentile of said powder.

"Median size" of a powder refers to the $D_{50}$ percentile, that is to say the size dividing the particles into first and second populations equal in weight, these first and second populations comprising only particles respectively exhibiting a size greater than or equal to, or less than, the median size.

"Block" is understood to mean a solid object obtained by molding a charge comprising a particulate mixture (unlike a lining layer).

"Matrix" is understood to mean a crystalline or noncrystalline phase which provides a continuous structure between the grains and which is obtained from the matrix fraction during the sintering.

"Sintering" refers to a heat treatment by which refractory particles of a preform are converted to form a matrix which bonds together other particles of said preform.

"Refractory product" is understood to mean a product exhibiting a melting or dissociation point of greater than 1000° C.

"Impurities" is understood to mean the unavoidable constituents, unintentionally and necessarily introduced with the starting materials or resulting from reactions with these constituents. The impurities are not necessary constituents but only tolerated constituents. Preferably, the amount by weight of the impurities is less than 2%, less than 1%, less than 0.5%, indeed even substantially zero.

"Precursor" of a compound or of an element is understood to mean a constituent capable of providing said compound or respectively said element during the implementation of a manufacturing process according to the invention.

The contents of oxides refer to the overall contents for each of the corresponding chemical elements, expressed in the form of the more stable oxide, according to the normal conventional of the industry.

Unless otherwise indicated, all the contents of oxides of the products according to the invention are percentages by weight, expressed on the basis of the oxides.

"Comprising a" is understood to mean "comprising at least one", unless otherwise indicated.

DETAILED DESCRIPTION

The sintered refractory product according to the invention is composed of grains bonded and surrounded by a matrix.

The grains may exhibit varied chemical analyses, in particular may comprise chromium oxide.

In particular, the aggregate may be composed, for more than 80%, indeed even more than 85%, indeed even more than 90%, indeed even more than 95%, indeed even more than 97%, of its weight, of chromium oxide and/or aluminum oxide, in particular of chromium oxide.

The matrix preferably comprises zirconium oxide. The only zirconium oxide present in the matrix preferably represents more than 2.5%, indeed even more than 5%, indeed even more than 10% of the total weight of the product. The zirconium oxide is stabilized by yttrium oxide and at least 20% by weight is stabilized in the cubic and tetragonal form.

In particular, the matrix may be composed, for more than 90%, indeed even more than 94%, of its weight, of zirconium oxide and of yttrium oxide and/or of chromium oxide and/or of aluminum oxide and/or of silicon oxide, and optionally of a codopant chosen from CaO, MgO, $TiO_2$ and their mixtures, the codopant acting or not acting as stabilizer for the zirconium oxide. Preferably, the codopant is CaO.

In one embodiment, the product comprises, as percentage by weight on the basis of the oxides, for a total of 100%,
60%<$Cr_2O_3$<95%, preferably 65%<$Cr_2O_3$<90%,
1%<$Al_2O_3$<25%, preferably 2%<$Al_2O_3$<10%, preferably $Al_2O_3$<5%,
3%<$ZrO_2$<10%, preferably 4%<$ZrO_2$<8%,
$HfO_2$<1.0%, preferably $HfO_2$<0.5%,
0.1%<$Y_2O_3$<4.0%, preferably 0.2%<$Y_2O_3$<3.0%,
other oxides <10%, preferably other oxides <5%.

Use may be made, in order to manufacture a block made of a sintered refractory product according to the invention, of a process comprising stages a) to e) above.

Stages a) to e) are stages conventionally employed to manufacture sintered products.

In stage a), a charge is prepared comprising:
a particulate mixture composed of particles of the oxides intended to form the sintered refractory product and/or of particles of precursors of these oxides,
optionally one or more additives,
optionally water.

The composition of the particulate mixture of the charge is determined as a function of the final composition of the block.

Preferably, the particulate mixture is composed, for more than 90%, more than 95%, indeed even substantially 100%, by weight, of particles having a size of less than 20 mm.

Preferably, the grains represent more than 60%, indeed even more than 70%, and/or less than 90%, less than 80%, of the weight of the particulate mixture, the remainder to 100% being composed of the matrix particles.

The way of determining the amounts of the oxides or precursors of oxides in the charge is fully known to a person skilled in the art. In particular, a person skilled in the art knows that the chromium oxide, aluminum oxide and zirconium oxide present in the starting charge are reencountered in the refractory product manufactured. Some oxides may also be contributed by the additives. For one and the same amount of the constituents of the sintered refractory product, the composition of the starting charge may thus vary, in particular as a function of the amounts and of the nature of the additives present in this charge.

The chromium oxide may be contributed in the form of a mixture of sintered or fused particles of chromium oxide optionally comprising aluminum oxide.

Preferably, the source of zirconium oxide comprises more than 80%, preferably more than 90%, by weight of zirconium oxide.

The zirconium oxide is contributed in the form of a stabilized zirconium oxide powder, preferably stabilized by means of yttrium oxide. At least 20% by weight of the zirconium oxide is stabilized in the cubic and/or tetragonal form. The zirconium oxide may comprise a codopant. Preferably, the codopant is chosen from CaO, MgO, $TiO_2$ and their mixtures. Preferably, the codopant is CaO.

Preferably, the zirconium oxide is doped to more than 3%, indeed even more than 4%, indeed even more than 5%, with yttrium oxide and optionally a codopant, preferably chosen from CaO, MgO, $TiO_2$ and their mixtures, as a percentage by weight on the basis of the total weight of the zirconium oxide, yttrium oxide and codopant. Preferably, the codopant is CaO and its content in the zirconium oxide powder is between 2% and 4%, on the basis of the total weight of the zirconium oxide, yttrium oxide and calcium oxide.

The stabilized zirconium oxide is preferably introduced, for more than 70%, more than 80%, more than 90%, indeed even substantially 100%, of its weight, in the form of matrix particles.

The hafnium oxide $HfO_2$ is always naturally present in the sources of zirconium oxide, at contents generally less than 2%. In one embodiment, the hafnium oxide is introduced only as impurities, in particular with the source of zirconium oxide.

The aluminum oxide may in particular be contributed in the aggregate in the form of a mixture of sintered or fused particles of chromium oxide and aluminum oxide or in the matrix fraction in the form of a mixture of particles of calcined or reactive alumina, indeed even of white corundum.

The additives may be added to the charge in order to provide it with sufficient plasticity during the shaping stage b) and in order to confer sufficient mechanical strength on the preform obtained at the end of stages c) and d). Mention may be made, as examples of usable additives well known to a person skilled in the art, without implied limitation, of:

- temporary (that is to say, removed in all or in part during the drying and firing stages) organic binders, such as resins, cellulose derivatives or lignone, or polyvinyl alcohols; preferably, the amount of temporary binder is between 0.1 and 6% by weight, with respect to the weight of the particulate mixture of the charge;
- shaping agents, such as magnesium stearate or calcium stearate;
- hydraulic binders, such as a cement of CaO aluminate type;
- deflocculants, such as alkali metal polyphosphates or methacrylate derivatives;
- sintering promoters, such as titanium dioxide or magnesium hydroxide;
- additions of clay type which will facilitate the processing and help in the sintering. These additions contribute alumina and silicon oxide, and a few alkali metal or alkaline earth metal oxides, indeed even iron oxide, depending on the type of clay.

The amounts of additives are not limiting. In particular, the amounts conventionally employed in sintering processes are appropriate.

Preferably, the content of clay in the starting charge is greater than 0.5%, greater than 1.0%, greater than 1.5%, and/or less than 5.0%, less than 3.0%, as percentage by weight on the basis of the oxides.

The sources of zirconium oxide conventionally comprised traces of hafnium oxide.

If appropriate, if an additive contributes one or more of the oxides participating in the composition of the refractory product, this contribution is preferably taken into account in determining the composition of the particulate mixture.

Preferably, the charge comprises, as percentage by weight:
- more than 60% and preferably less than 90% of grains;
- less than 40% of matrix particles;
- less than 7% of one or more shaping additives.

Preferably, the grains and the matrix particles together represent more than 94%, preferably more than 95%, of the weight of the charge.

The mixing of the different constituents of the charge is continued until a substantially homogeneous mass is obtained.

Preferably, between 1% and 5% of water, as a percentage by weight on the basis of the particulate mixture, is added.

The charge is preferably conditioned. Advantageously, it is thus ready for use.

The invention also relates to a particulate mixture as described above and to a charge prepared or capable of having been prepared during a stage a).

In stage b), the charge is placed in a mold and then shaped.

In the case of a shaping by pressing, a specific pressure of 400 to 800 $kg/cm^2$ is appropriate. The pressing is preferably carried out in a uniaxial or isostatic manner, for example using a hydraulic press. It may advantageously be preceded by a manual or pneumatic ramming and/or vibrating operation.

In stage c), the preform thus obtained is removed from the mold.

In stage d), the drying may be carried out at a moderately high temperature.

Preferably, it is carried out at a temperature between 110° C. and 200° C. It conventionally lasts between 10 hours and a week, depending on the format of the preform, until the residual moisture content of the preform is less than 0.5%.

The invention also relates to a preform obtained in stage c) or in stage d).

In stage e), the dried preform is fired. The duration of the firing, of between 3 and 15 days approximately from cold to cold, may vary according to the composition but also according to the size and the shape of the preform. The firing cycle is preferably carried out conventionally, under air, at a temperature of between 1300° C. and 1600° C.

Preferably, the sintered refractory product obtained on conclusion of stage e) exists in the form of a block having a weight of greater than 1 kg and/or for which all the dimensions are greater than 100 mm.

Surprisingly, the sintered refractory product obtained on conclusion of stage e) has proved to be particularly resistant to the stresses encountered inside gasifier reactors, in particular resistant to infiltration by the slags or the molten ashes.

The firing stage e) may be carried out, in all or in part, after assembly of the preform in the reactor.

The blocks are assembled by means of appropriate expansion joints, according to techniques well known to a person skilled in the art.

The manufacture of a product according to the invention is not limited to the process described above. In particular, the invention also relates to a refractory product according to the invention in the form of a lining of a reactor, in particular of a gasifier. To this end, a charge, for example manufactured according to stage a) above, may be applied as a layer on the internal surface of the wall of the reactor, for example by casting, vibro-casting or spraying, according to requirements and with great flexibility, and then sintered in situ during the preheating of the reactor, so as to produce a lining made of a refractory product according to the invention. The sintering preferably takes place at atmospheric pressure, preferably under an oxidizing atmosphere, and preferably at a temperature between 1300 and 1600° C.

In order not to needlessly expand the present description, not all the possible combinations according to the invention of the various embodiments are given. However, it is clearly understood that all the possible combinations of the initial and/or preferred ranges and values described above as regards the product, the matrix or the aggregate or also the process are envisaged.

EXAMPLES

The examples which will follow make it possible to nonexhaustively illustrate the invention. For these examples, the following starting materials were used:
- sintered chromium oxide powder comprising approximately 98% of $Cr_2O_3$ and 2% of $TiO_2$ by weight and composed of at least 90% by weight of particles having a size of greater than 20 microns but less than 5 mm (powder G1), sintered chromium oxide powder comprising approximately 88% of $Cr_2O_3$, approximately 6% of $Al_2O_3$, approximately 3.5% of $SiO_2$ and approximately 1.8% of $TiO_2$ by weight and composed of at least 90% by weight of particles having a size of greater than 20 microns but less than 5 mm (powder G2), sintered chromium oxide powder comprising approximately 45% of $Cr_2O_3$, approximately 52% of $Al_2O_3$, approximately 1.1% of $SiO_2$ and approximately 1.6% of $TiO_2$ by weight and composed of at least 90% by weight of particles having a size of greater than 20 microns but less than 5 mm (powder G3), pigment chromium oxide powder (>98% of $Cr_2O_3$), the median size ($D_{50}$) of which is less than 2 microns (powder P1), zirconium oxide powder (>98% by weight of $ZrO_2$) stabilized with 4.2% by weight of CaO, the size of the particles being less than 50 microns, the median size being approximately 12 µm, and said particles comprising approximately 70% of zirconium oxide in the tetragonal and/or cubic form (powder P2), alumina powder (>98% by weight of $Al_2O_3$), the median size ($D_{50}$) of which is less than 10 microns (powder P3), zirconium oxide powder (>91% by weight of $ZrO_2$) stabilized with approximately 3.2% by weight of CaO and approximately 1.1% by weight of $Y_2O_3$, comprising approximately 70% of zirconium oxide in the tetragonal and/or cubic form, as a percentage by weight on the basis of the zirconia, the size of the particles being less than 60 microns ($D_{90}$=47 µm) with a median size of approximately 13 µm (powder P4), zirconium oxide powder (>91% by weight of $ZrO_2$) stabilized with approximately 6.4% by weight of $Y_2O_3$, comprising approximately 70% of zirconium oxide in the tetragonal and/or cubic form, as a percentage by weight on the basis of the zirconia, the size of the particles being less than 50 microns ($D_{90}$=34 µm) with a median size of approximately 8 µm (powder P5a), or being less than 50 microns ($D_{90}$=8 µm) with a median size of approximately 3 µm (powder P5b), yttrium oxide powder (>99% of $Y_2O_3$), the median size ($D_{50}$) of which is between 5 and 10 microns (powder P6), additives: RR40 clay comprising approximately 40% of $Al_2O_3$, approximately 55% of $SiO_2$, approximately 2.3% of $TiO_2$, approximately 2% of $Fe_2O_3$ and approximately 0.6% of CaO.

The products tested were manufactured according to stages a) to e) described above.

In stage a), the starting materials as shown in table 1 were mixed with from 0.5 to 2% of RR40 clay and approximately 3% of water and also from 0.3 to 0.7% of binders (magnesia stearate and Bretax C) were added to the particulate mixture, as a percentage on the basis of said particulate mixture.

The silicon oxide originates essentially from the addition of clay.

In stage b), compacting of the charge inside the mold at a pressure of 600 kg/cm$^2$ was carried out so as to form a preform.

In stage d), the firing was carried out under air at a temperature of between 1400 and 1600° C. so as to form a sintered refractory product.

The bulk density (Bd) and open porosity (Op) measurements were carried out according to the standard ISO 5017 on the products before any corrosion.

The change in the flexural modulus of rupture of products which have been subjected to a thermal shock between 800° C. and 20° C. was evaluated according to the standard ISO 5014. The residual flexural modulus of rupture value after a thermal shock test is denoted "MOR res" and the loss in MOR ("MOR res" with respect to the initial MOR measured at 20° C.) is denoted "ΔMOR" in table 1. The "MOR res" has to be as high as possible. A lower "ΔMOR" (of at least 20% in absolute value) indicates a greater stability of the properties of the product. Likewise, the residual flexural modulus of rupture value after three thermal shock tests is denoted "MOR res 3" and the loss in MOR ("MOR res 3" with respect to the initial MOR measured at 20° C.) is denoted "ΔMOR 3" in table 1.

The other measurements were carried out on products subjected, after sintering, to a corrosion representative of the operating conditions experienced by the hot face of the gasifier linings. This corrosion was obtained in the following way. Eight test specimens of the product to be tested, with a length of 200 mm and with a trapezoidal section, the bases of which measure 63 mm and 90 mm respectively and the height of which measures 33 mm, are placed in a metal hoop in order to form a rotary furnace in which the molten slag is placed, at a temperature of 1600° C., for 5 hours. The test specimens and the hoop are rotated at a speed of 2 revolutions per minute.

The slag used exhibits the following composition by weight:
$SiO_2$: approximately 30-50%
$Al_2O_3$: approximately 10-20%
$Fe_2O_3$ or FeO: 15-25%
CaO: approximately 10-20%
Other entities, such as MgO: remainder to 100%.

The basicity index B of this slag, that is to say the $(CaO+MgO+Fe_2O_3)/(SiO_2+Al_2O_3)$ ratio by weight, was typically of the order of 0.6. The $CaO/SiO_2$ ratio by weight was of the order of 0.4.

The depth of penetration of CaO originating from the slag is measured by virtue of a microprobe analyzer carried out on a metallographic section. The indicator of penetration (Ip) is equal to the ratio of the depth penetrated of the test specimen of the reference example (example 1 for examples 2 to 8, example 9 for examples 10, 13 and 14, example 11 for example 12 and example 15 for example 16) to the depth penetrated of the test specimen of the example under consideration, multiplied by 100. Ip is thus 100 for the reference product and a value of greater than 110 indicates a better resistance to the penetration of the slag. The values of greater than 165 are representative of a very significantly improved resistance to the penetration of the slag (+50%).

The results obtained are summarized in table 1 below.

The $HfO_2$ content is substantially equal to 0.1%.

TABLE 1

| No. | 1 | 2 | 3 | 4 | 5 | 6 | 7 | 8 |
|---|---|---|---|---|---|---|---|---|
| Components of the charge | | | | | | | | |
| G1 | 74.5 | 74.5 | 74.5 | 74.5 | 74.5 | 74.5 | 74.5 | 74.5 |
| P1 | 14.7 | 14.7 | 14.7 | 14.7 | 14.7 | 14.7 | 14.7 | 14.7 |
| P2 | 6.9 | 5.9 | 3.4 | | | | | |
| P3 | 1.9 | 1.9 | 1.9 | 1.9 | 1.9 | 1.9 | 1.9 | 1.9 |
| P4 | | | | 6.9 | | | 3.4 | 3.4 |
| P5a | | | 3.4 | | 6.9 | | | 3.4 |

TABLE 1-continued

| No. | 1 | 2 | 3 | 4 | 5 | 6 | 7 | 8 |
|---|---|---|---|---|---|---|---|---|
| P5b | | | | | | | 6.9 | 3.4 |
| P6 | | 1.0 | | | | | | |
| Chemical analysis, calculated on the basis of the starting materials (as % by weight) | | | | | | | | |
| $Cr_2O_3$ | 87.6 | 87.6 | 87.7 | 87.7 | 87.6 | 87.7 | 87.7 | 87.7 |
| $ZrO_2 + HfO_2$ | 6.5 | 5.6 | 6.4 | 6.4 | 6.4 | 6.4 | 6.4 | 6.4 |
| $SiO_2$ | 1.1 | 1.1 | 1.1 | 1.1 | 1.1 | 1.1 | 1.1 | 1.1 |
| $Al_2O_3$ | 2.8 | 2.8 | 2.8 | 2.8 | 2.8 | 2.8 | 2.8 | 2.8 |
| $TiO_2$ | 1.6 | 1.6 | 1.6 | 1.6 | 1.6 | 1.6 | 1.6 | 1.6 |
| CaO | 0.3 | 0.3 | 0.2 | 0.2 | / | / | 0.1 | 0.1 |
| $Y_2O_3$ | / | 1.0 | 0.2 | 0.1 | 0.5 | 0.4 | 0.3 | 0.3 |
| Other properties of the sintered product (before corrosion) | | | | | | | | |
| Bd (g/cm³) | 4.2 | 4.2 | 4.3 | 4.2 | 4.3 | 4.2 | 4.2 | 4.2 |
| Op (%) | 14.3 | 13.1 | 11.8 | 14.0 | 13.4 | 13.6 | 14.1 | 14.2 |
| Resistance to thermal shocks | | | | | | | | |
| MOR res (MPa) | 11 | 9 | 13 | 13 | 16 | 9 | 11 | 14 |
| ΔMOR (%) | −72 | −80 | −67 | −63 | −60 | −82 | −74 | −42 |
| MOR res 3 (MPa) | 3 | 3 | 8 | 5 | 3 | 2 | 4 | 13 |
| ΔMOR 3 (%) | −91 | −94 | −80 | −86 | −92 | −96 | −90 | −46 |
| Measurements of resistance to the penetration of CaO due to the corrosion | | | | | | | | |
| Ip | 100 | 109 | 207 | 164 | 249 | 328 | 295 | 193 |

TABLE 2

| No. | 9 | 10 | 11 | 12 | 13 | 14 | 15 | 16 |
|---|---|---|---|---|---|---|---|---|
| Components of the charge | | | | | | | | |
| G1 | 75.2 | 75.2 | | | 75.2 | 75.2 | 81.2 | 81.2 |
| G2 | | | 42 | 42 | | | | |
| G3 | | | 34 | 34 | | | | |
| P1 | 17.0 | 17.0 | 15 | 15 | 17.0 | 17.0 | 11.9 | 11.9 |
| P2 | 4.5 | | 7.0 | | | | 4.0 | |
| P3 | 2.3 | 2.3 | 2.0 | 2.0 | 2.3 | 2.3 | 2.0 | |
| P4 | | | | | 2.3 | 1.5 | | 1.0 |
| P5a | | 4.5 | | 7.0 | 2.2 | 3.0 | | 3.0 |
| Chemical analysis, calculated on the basis of the starting materials (as % by weight) | | | | | | | | |
| $Cr_2O_3$ | 90.7 | 90.9 | 65.2 | 65.2 | 90.7 | 90.7 | 91.4 | 91.4 |
| $ZrO_2 + HfO_2$ | 4.3 | 4.3 | 6.9 | 6.5 | 4.2 | 4.2 | 3.7 | 3.7 |
| $SiO_2$ | 0.6 | 0.3 | 2.4 | 2.4 | 0.6 | 0.6 | 0.6 | 0.6 |
| $Al_2O_3$ | 2.7 | 2.7 | 23.7 | 23.7 | 2.7 | 2.7 | 2.4 | 2.4 |
| $TiO_2$ | 1.5 | 1.5 | 1.2 | 1.2 | 1.5 | 1.5 | 1.7 | 1.7 |
| CaO | 0.19 | / | 0.4 | / | 0.05 | 0.08 | 0.17 | 0.04 |
| $Y_2O_3$ | / | 0.29 | / | 0.5 | 0.21 | 0.17 | / | 0.20 |
| Other properties of the sintered product (before corrosion) | | | | | | | | |
| Bd (g/cm³) | 4.2 | 4.3 | 4.0 | 4.0 | 4.2 | 4.2 | 4.2 | 4.2 |
| Op (%) | 14.6 | 13.1 | 13.4 | 12.5 | 16.3 | 15.8 | 15.0 | 15.5 |
| Resistance to thermal shocks | | | | | | | | |
| MOR res (MPa) | 10 | 11 | 11 | 10 | 17 | 19 | 9 | 16 |
| ΔMOR (%) | −71 | −76 | −51 | −63 | −32 | −27 | −71 | −43 |
| MOR res 3 (MPa) | ND | ND | ND | ND | 12 | 19 | 7 | 11 |
| ΔMOR 3 (%) | | | | | −50 | −54 | −79 | −60 |
| Measurements of resistance to the penetration of CaO due to the corrosion | | | | | | | | |
| Ip | 100 | 487 | 100 | 151 | 258 | 248 | 100 | 235 | greater than 70% by weight), which results in a reduction in the phenomenon of spelling, thus making it possible to improve the lifetime of products of this type.

This addition also makes it possible to retain, indeed even to improve, the resistance to thermal shocks, all the more so when the zirconium oxide powder doped with yttrium oxide introduced into the matrix fraction exhibits a median size of greater than 5 μm, as is shown by the comparison of examples 5 and 6 or 8 and 7.

The resistance to thermal shocks is also improved in a noteworthy way when a zirconium oxide power codoped with calcium oxide and yttrium oxide is used in synergy with a zirconium oxide powder doped with yttrium oxide, as is shown by the comparison of example 8 with examples 4 and 5 or also by the comparison of example 13 or 14 with example 10 or, finally, by the comparison of example 16 with example 15.

A comparison of examples 1 and 2 shows that the addition of yttrium oxide independently of the zirconium oxide does not improve the performance. It is thus important for the zirconium oxide to be stabilized, at least in part, indeed completely, by the yttrium oxide before the sintering.

In an application in a gasifier, examples 5 to 8, 13 and 14 are regarded as the best, and in particular examples 8, 13 and 14 offer a very good compromise between the resistance to the penetration of CaO, the resistance to thermal shocks and the manufacturing cost (CaO being cheaper than $Y_2O_3$).

The tables make it possible to confirm that the addition of zirconium oxide doped with yttrium oxide has a very favorable effect for the resistance to the penetration of the slag (Ip) once the content of yttrium oxide in the product has reached 0.1% by weight, in particular for the products having a higher content of chromium oxide (in particular of A comparison of examples 11 and 12 also illustrates the advantage of the addition of a powder formed of particles of zirconium oxide stabilized with yttrium oxide for improving the resistance to the penetration of CaO with regard to sintered products, the aggregate of which is composed of chromium oxide and aluminum oxide, while retaining a good resistance to thermal shocks. A comparison of these examples also confirms that a stabilization with yttrium oxide is more effective than a stabilization with calcium oxide.

An analysis with a scanning electron microscope (SEM) coupled with an EDS (Energy Dispersive Spectrometry) analysis makes it possible to confirm that, in the products of the invention, the yttrium oxide (and, if appropriate, the calcium oxide) is indeed combined with the zirconium oxide of the matrix.

Of course, the present invention is not limited to the embodiments described, provided as illustrative and non-limiting examples.

In particular, the application of the sintered refractory product according to the invention is not limited to a gasifier.

The invention claimed is:

1. A sintered refractory product exhibiting an aggregate bonded by a matrix wherein the sintered refractory product comprises, as percentages by weight on the basis of the oxides:
   more than 40% of chromium oxide $Cr_2O_3$,
   less than 50% of aluminum oxide $Al_2O_3$,
   1% or more of zirconium oxide $ZrO_2$, at least 20% by weight of which is stabilized in the cubic and/or tetragonal form,
   0.1% or more and less than 2.0% of yttrium oxide $Y_2O_3$, acting as stabilizer for the zirconium oxide $ZrO_2$,
   less than 1.9% of hafnium oxide $HfO_2$,
   the total content of chromium oxide, aluminum oxide and zirconium oxide $Cr_2O_3+Al_2O_3+ZrO_2$ being greater than 70%,
   said product comprising a codopant, acting or not acting as stabilizer for the zirconium oxide, selected from the group consisting of CaO, MgO, $TiO_2$, and mixtures thereof, a sum of the contents of calcium oxide, magnesium oxide, and titanium oxide Cao+MgO+$TiO_2$ being less than 6.0% and greater than 0.5%, as percentages by weight, and more than 50% of the yttrium oxide and of the codopant being present in the matrix, as percentage by weight.

2. The product as claimed in claim 1, in which:
   the content of chromium oxide $Cr_2O_3$ is greater than 65%, and/or
   the content of aluminum oxide $Al_2O_3$ is less than 35%, and/or
   the content of zirconium oxide $ZrO_2$ is greater than 3%, and/or
   the content of yttrium oxide $Y_2O_3$ is greater than 0.2%, and/or
   the total content of chromium oxide, aluminum oxide and zirconium oxide $Cr_2O_3+Al_2O_3+ZrO_2$ is greater than 80%,
   as percentages by weight on the basis of the oxides.

3. The product as claimed in claim 2, in which:
   the content of chromium oxide $Cr_2O_3$ is greater than 75%, and/or
   the content of aluminum oxide $Al_2O_3$ is less than 10%, and/or
   the content of zirconium oxide $ZrO_2$ is greater than 4.5%, and/or
   the content of yttrium oxide $Y_2O_3$ is greater than 0.3%, and/or
   the total content of chromium oxide, aluminum oxide and zirconium oxide $Cr_2O_3+Al_2O_3+ZrO_2$ is greater than 90%, and/or
   the sum of the contents of chromium oxide $Cr_2O_3$, aluminum oxide $Al_2O_3$, zirconium oxide $ZrO_2$, yttrium oxide $Y_2O_3$, calcium oxide CaO, silicon oxide $SiO_2$, magnesium oxide MgO, titanium oxide $TiO_2$ and hafnium oxide $HfO_2$ is greater than 95%,
   as percentages by weight on the basis of the oxides.

4. The product as claimed in claim 3, in which:
   the content of chromium oxide $Cr_2O_3$ is greater than 80%, and/or
   the content of aluminum oxide $Al_2O_3$ is less than 5%, and/or
   the content of zirconium oxide $ZrO_2$ is greater than 5%.

5. The product as claimed in claim 1, in which more than 50% of the zirconium oxide is stabilized in the cubic and/or tetragonal form, as percentage by weight.

6. The product as claimed in claim 1, in which the only zirconium oxide present in the matrix represents more than 2.5% of the total weight of the product.

7. The product as claimed in claim 1, in which more than 90% of the yttrium oxide $Y_2O_3$ is present in the matrix.

8. The product as claimed in claim 1, in which the content of aluminum oxide $Al_2O_3$ in the matrix is greater than 1% and less than 10%, as percentage by weight on the basis of the weight of the oxides of the product.

9. The product as claimed in claim 1, in which:
   the content of aluminum oxide $Al_2O_3$ is greater than 1%, and/or
   the content of silicon oxide $SiO_2$ is greater than 0.5% and less than 6%,
   as percentages by weight on the basis of the oxides.

10. The product as claimed in claim 1, in which:
    the content of aluminum oxide $Al_2O_3$ is greater than 2%, and/or
    the content of silicon oxide $SiO_2$ is less than 3%.

11. The product as claimed in claim 1, comprising, as percentage by weight on the basis of the oxides, for a total of 100%:
    60%<$Cr_2O_3$<95%,
    1% <$Al_2O_3$<25%,
    3% <$ZrO_2$<10%,
    $HfO_2$<1.0%,
    0.1% <$Y_2O_3$<2.0%,
    other oxides <10%.

12. The product as claimed in claim 1, wherein the codopant is CaO.

13. The product as claimed in claim 12, wherein the content of CaO is greater than 0.04%.

14. The product as claimed in claim 12, wherein the content of CaO is greater than 0.1%.

15. The product as claimed in claim 12, wherein the content of CaO is greater than 0.2%.

16. The product as claimed in claim 1, manufactured by sintering a charge comprising a zirconium oxide powder codoped with calcium oxide and yttrium oxide, and a zirconium oxide powder doped with yttrium oxide.

17. The product as claimed in claim 1, wherein the content of MgO is greater than 0.1%.

18. The product as claimed in claim 1, wherein the content of MgO is greater than 0.5%.

19. The product as claimed in claim 1, wherein the content of $TiO_2$ is greater than 0.5%.

20. The product as claimed in claim 1, comprising, as percentage by weight on the basis of the oxides, for a total of 100%:
    65%<$Cr_2O_3$<90%,
    2%<$Al_2O_3$<10%,
    4%<$ZrO_2$<8%,
    $HfO_2$<0.5%,
    0.2% <$Y_2O_3$<2.0%,
    other oxides <5%.

21. The product as claimed in claim 1, wherein more than 90% of the yttrium oxide and of the codopant being present in the matrix, as percentage by weight.

22. A gasifier comprising a reactor provided with an internal wall lined, at least partially, with a refractory lining comprising a product as claimed in claim 1.

23. The gasifier as claimed in claim 22, in which said refractory product is provided in the form of a layer or in the form of a block.

24. A manufacturing process of a sintered refractory product, the process comprising the following successive stages:
   a) preparation of a charge,
   b) casting said charge in a mold and shaping so as to form a preform,
   c) removing the preform from the mold,
   d) optionally, drying the preform,
   e) firing the preform at a temperature of between 1300 and 1600° C., so as to form a sintered refractory product,
      in which process the charge is suitable for resulting, at the end of stage e), in the sintered refractory product as claimed in claim 1, the charge comprising a matrix fraction comprising a zirconium oxide powder stabilized, at least in part, with yttrium oxide.

* * * * *